(12) United States Patent
Bonanno

(10) Patent No.: US 11,242,796 B2
(45) Date of Patent: Feb. 8, 2022

(54) VALVE

(71) Applicant: Vitesco Technologies GmbH, Hannover (DE)

(72) Inventor: Rosario Bonanno, Schwalbach a. Ts. (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 17/270,688

(22) PCT Filed: May 20, 2019

(86) PCT No.: PCT/EP2019/062934
§ 371 (c)(1),
(2) Date: Feb. 23, 2021

(87) PCT Pub. No.: WO2020/043330
PCT Pub. Date: Mar. 5, 2020

(65) Prior Publication Data
US 2021/0317776 A1 Oct. 14, 2021

(30) Foreign Application Priority Data

Aug. 27, 2018 (DE) ...................... 10 2018 214 458.3

(51) Int. Cl.
*F02B 37/18* (2006.01)
*F16K 31/06* (2006.01)
*F16K 1/46* (2006.01)

(52) U.S. Cl.
CPC .............. *F02B 37/183* (2013.01); *F16K 1/46* (2013.01); *F16K 31/0655* (2013.01); *F05D 2220/40* (2013.01)

(58) Field of Classification Search
CPC ...... F02B 37/183; F16K 1/46; F16K 31/0655; F05D 2220/40
See application file for complete search history.

(56) References Cited

U.S. PATENT DOCUMENTS 10,550,953 B2    2/2020   Ito

FOREIGN PATENT DOCUMENTS

CN          204611049         9/2015
DE         102004053849       5/2006
(Continued)

OTHER PUBLICATIONS

Office Action dated Apr. 22, 2021 issued in German Patent Application No. 102018214458.3.

*Primary Examiner* — Audrey B. Walter
*Assistant Examiner* — Edward Bushard
(74) *Attorney, Agent, or Firm* — Cozen O'Connor

(57) ABSTRACT

A valve for blocking and releasing a flow path, having an electromagnetic actuator unit, a pin axially movable by the electromagnetic actuator unit, a closure element connected to the pin. The closure element is designed to block and release a flow path and has a first axial end arranged remotely from the flow path and is connected to the pin, and a second axial end arranged in the flow path, and a housing which receives at least the pin and the first axial end of the closure element. At least in a region of its first axial end, the closure element has a radially circumferential seal with an outwardly protruding seal lip. The seal lip lies sealingly against a region of the housing in a closed state of the valve, and the seal lip has at least one radially circumferential bead.

11 Claims, 2 Drawing Sheets

(56) References Cited

FOREIGN PATENT DOCUMENTS

| | | | |
|---|---|---|---|
| DE | 102008031738 | 1/2010 | |
| DE | 102008031738 A1 * | 1/2010 | ......... F16K 31/0693 |
| DE | 102012010140 | 11/2013 | |
| DE | 102017202511 | 6/2018 | |
| WO | WO 2017/141606 | 8/2017 | |
| WO | WO 2018114525 | 6/2018 | |
| WO | WO 2019121305 | 6/2019 | |

* cited by examiner

VALVE

CROSS REFERENCE TO RELATED APPLICATIONS

This is a U.S. national stage of Application No. PCT/EP2019/062934 filed May 20, 2019. Priority is claimed on German Application No. DE 10 2018 214 458.3 filed Aug. 27, 2018 the content of which is incorporated herein by reference.

BACKGROUND OF THE INVENTION

1. Field of the Invention

The present invention concerns a valve that can be actuated by an electromagnetic actuator unit for blocking and releasing a flow path.

2. Description of Related Art

Such valves are used, for example, as recirculation dump valves on a turbocharger in a motor vehicle in order to open up a bypass to an intake side in overrun operation. To prevent excessive braking of the turbine of the turbocharger at low rotation speeds, but also to guarantee rapid run-up, fast opening and closing processes of the valve are desired. The aim in particular is to achieve, in the closing process, a very rapid closure by contact of the closure element on a valve seat. The valve seat is formed by the housing of the turbocharger, on which the valve is flange-mounted. In addition, the axially displaceable closure element must be sealed against the housing. For this purpose, it is known for example to arrange a V-shaped seal in the housing, the limbs of which bear in each case against the housing and the casing surface of the pot-shaped closure element. The sealing action is achieved by the preload of the two limbs. It is disadvantageous here that the seal lip, bearing against the closure element, of one limb is subjected to friction owing to the movement of the closure element during the opening and closing, resulting in increased wear.

SUMMARY OF THE INVENTION

One aspect of the invention is providing a valve with improved sealing function.

According to one aspect of the invention, a valve is provided for blocking and releasing a flow path, wherein the valve has an electromagnetic actuator unit and a pin that can be axially moved by the electromagnetic actuator unit, and a closure element connected to the pin, wherein the closure element is designed to block and release a flow path and has a first axial end, which is arranged remotely from the flow path and is connected to the pin, and a second axial end that can be arranged in the flow path.

Furthermore, the valve has a housing that receives at least the pin and the first axial end of the closure element, wherein the closure element is sealed against the housing by at least one seal.

At least in a region of its first axial end, the closure element has a radially circumferential seal with an outwardly protruding seal lip, wherein the seal lip lies sealingly against a region of the housing in a closed state of the valve and has at least one radially circumferential bead.

Here and in the description which follows, a closed state of the valve means the switched state of the valve in which the closure element blocks the flow path.

An outwardly protruding seal lip, here and in the description which follows, means a seal lip that also extends at least towards the outside. In particular, this also means a seal lip which extends obliquely upward to the outside, i.e. both radially outwardly and in the direction of the pin.

A bead, here and in the description which follows, is a channel-like bulge in the seal lip, within which the seal lip has substantially the same wall thickness as in the environment of the bead. If the seal lip is made of a plastic material, the bead may for example be formed in an injection-molding process.

The valve has the advantage that the seal of the closure element against the housing is restricted to a period in which the closure element is in the closed position, including a period immediately before the closure element comes to rest. The seal assigned to the closure element is thus not constantly in friction-inducing contact with the housing, but only while in the closed position and immediately before this, so that almost no friction occurs between the seal and the housing. Thus the wear occurring is kept low.

The sealing effect is achieved in particular because the seal lip lies sealingly on a region of the housing when the valve is in a closed state. The outwardly protruding seal lip is configured particularly flexibly because a radially circumferential bead is provided that increases the flexibility of the seal lip.

This achieves a particularly good sealing effect because the closure body is pressed into the closed position under the influence of the spring force, and the elastic seal lip deforms to achieve a reliable sealing effect. The bead thus improves the deformability of the seal lip.

According to one aspect of the invention, the bead is arranged in the radial direction between a sealing region of the seal and the closure element.

The sealing region, here and in the description which follows, means the region in which contact exists between the seal lip and the housing when the valve is in the closed state. This region is in particular configured as an annular face.

By arranging the bead between the annular sealing region and the closure element, the flexibility of the seal lip is increased in precisely the region in which it is particularly advantageous to achieve a good sealing effect.

According to one aspect of the invention, the bead is semicircular in the longitudinal section and formed open in the direction of the second radial end of the closure element.

The bead may however, for example, also be semi-oval in longitudinal section or irregularly curved, and be curved in the direction of the first radial end.

It would also be conceivable to provide several beads in the seal lip that surround the closure element radially or substantially radially, wherein different geometries of the beads may be combined.

In particular, the bead has a wall thickness d with 0.4 mm≤d≤0.8 mm.

In the transitional region to the bead, the seal lip may have a radius of curvature r with 0.5 mm≤r≤1.5 mm.

It has been found that such a geometry of the seal lip, with a bead wall thickness of at least 0.4 mm and at most 0.8 mm, and with radii of curvature of at least 0.5 mm and most 1.5 mm in the transitional region to the seal lip, is particularly suitable for achieving the desired flexibility.

The closure element may in particular be formed pot-like and open at the top, and the seal may cover both an outside and an inside of a side wall of the closure element. The seal may also cover at least regions of a base of the closure element.

This has the advantage that a particularly secure connection between the closure element and the seal is created, which is simple to create since the seal can be connected to the closure element in a single working step. The seal in particular may be vulcanized onto the closing element. For this, the closure element may for example be placed in a casting mold and the seal material injected around it.

The seal may in particular be made of a rubber, in particular a fluoro-rubber.

The closure element is in particular a deep-drawn part formed for example from chromium-nickel steel. Such a closure element has a high resistance to aggressive media and high temperatures, and accordingly a long service life.

According to a further aspect of the invention, a motor vehicle is indicated with a turbocharger device comprising an intake side with a compressor and a turbine side with a turbine, wherein a bypass line to the compressor is arranged on the intake side, wherein the described valve is arranged in the bypass line for releasing or blocking the bypass line.

According to this aspect, accordingly the described valve is used as a recirculation dump valve on the turbocharger. Because of the particularly flexible seal lip of the seal, the valve has an improved sealing function.

BRIEF DESCRIPTION OF THE DRAWINGS

Embodiments of the invention will now be explained in greater detail with reference to the accompanying figures.

DETAILED DESCRIPTION PRESENTLY PREFERRED EMBODIMENTS

Figure 1:
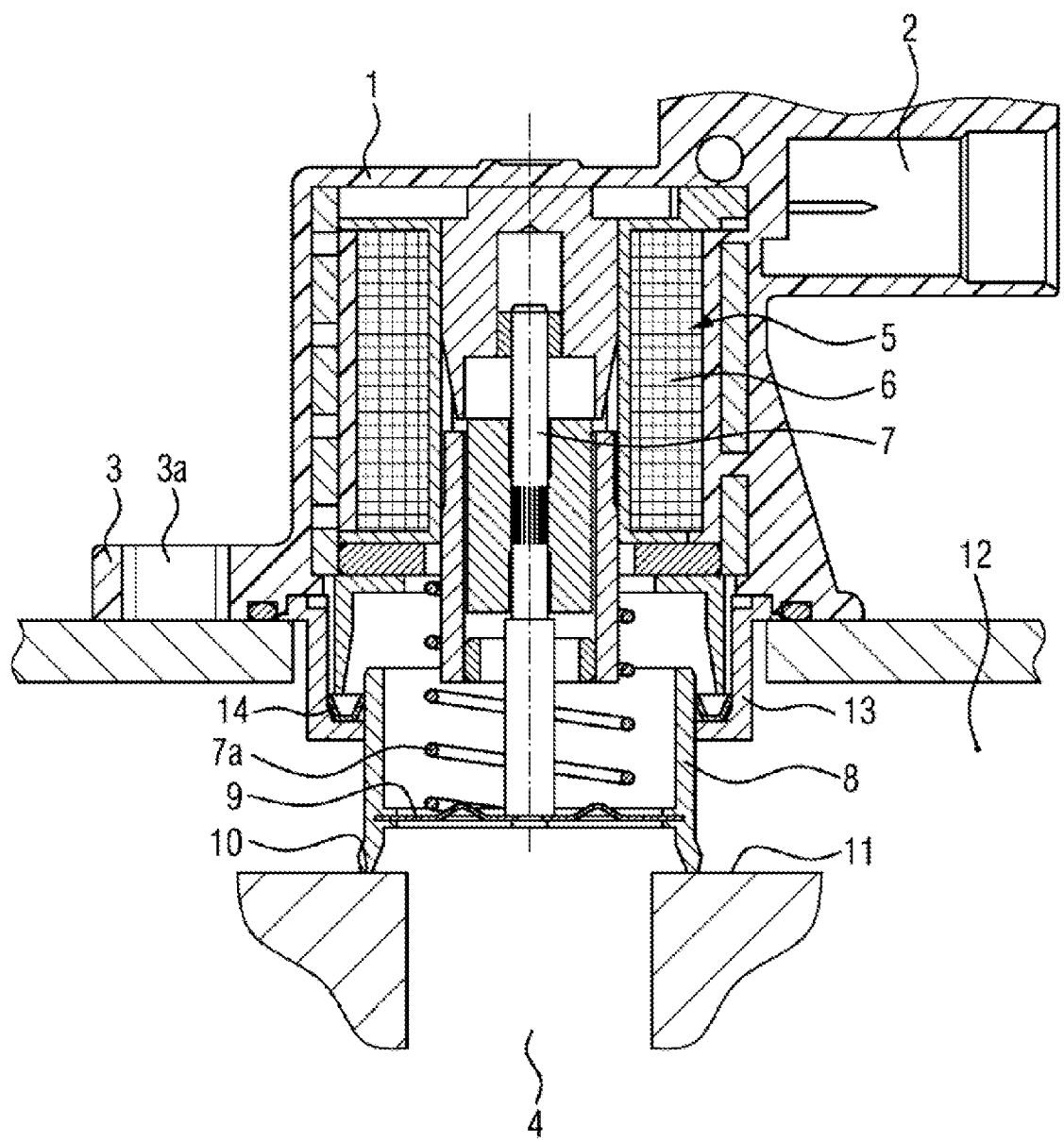
FIG. 1 is a recirculation dump valve for a turbocharger according to the prior art.

FIG. 1 shows schematically a valve 1, configured as a recirculation dump valve for a turbocharger (not shown) of a vehicle, as known from the prior art. The valve 1 is shown in FIG. 1, as in all figures, in longitudinal section, i.e. cut parallel to a longitudinal axis of the valve.

The valve 1 comprises a housing 2 with an integrally formed flange 3 having bores 3a, via which the housing 2 is flanged-mounted on the turbocharger (not shown) in the region of a bypass line 4. In the installed position shown, the flange 3 is adjoined by a second housing part 13 of the valve 1.

An electromagnetic actuator unit 5 having a coil 6 and a metal pin 7 serving as an armature 8 is arranged in the housing 2. The pin 7 is fixedly connected to a pot-like closure element 8. The pot-like closure element 8, serving as a piston, cooperates with a valve seat 11 in order to block or release the bypass line 4. For this, the closure element 8 has an annular sealing face 10 which can seal the cross-section of the bypass line 4 so that no medium can flow between the line 4 and the line 12. A spring 7a presses the closure element 8 in the direction of the valve seat 11. The force of e.g. 3.5N generated by the spring 7a is counteracted by the force acting on the base 9 of the closing element 8 owing to the pressure in the line 12.

The closure element 8 is sealed against the second housing part 13 by means of an annular seal 14 with V-shaped profile.

Figure 2:
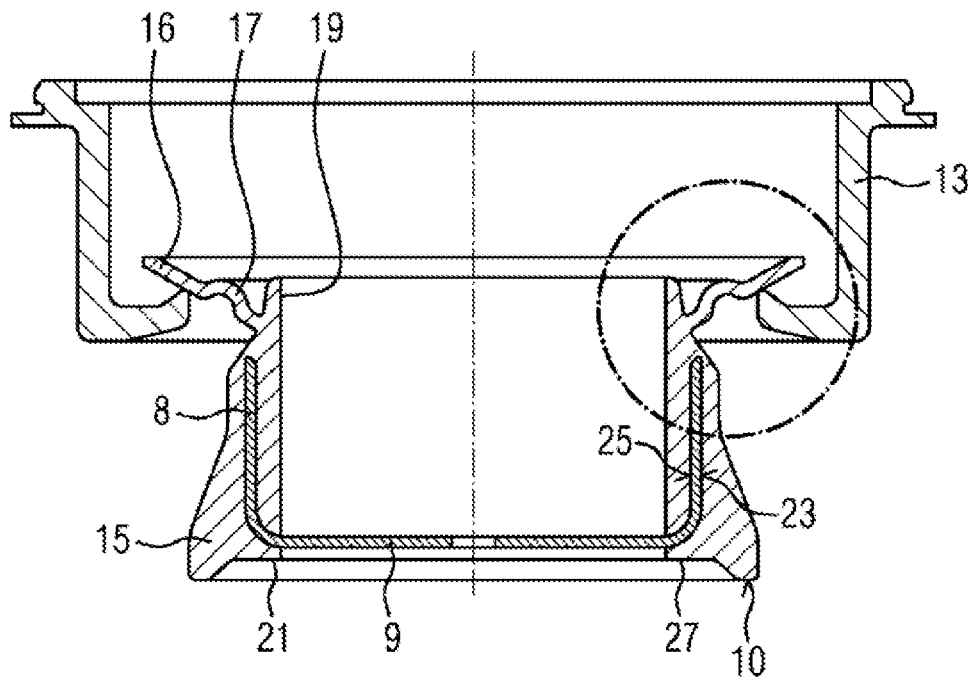
FIG. 2 is a longitudinal section of a valve, schematically.

FIG. 2 shows parts of a valve 1 for blocking and releasing a flow path according to one embodiment of the invention. The valve 1 shown in FIG. 2 differs from the known valve shown in FIG. 1 in particular by the design of the seal between the closure element 8 and the second housing part 13.

The valve 1 according to FIG. 2 has, at a first axial end 19 of the closure element 8, a radially circumferential seal 15 with an outwardly protruding seal lip 16. Here, the seal lip 16 extends radially outward starting from the closure element 8, and at least in the closed position of the valve 1 shown in FIG. 2, also extends upward in the direction of the pin 7, not shown in FIG. 2. The sealing effect is achieved by contact of the elastic seal lip 16 on the second housing part 13.

The seal lip 16 has a radially circumferential bead 17 that allows a particularly good elasticity of the seal lip 16 and hence a particularly good sealing effect. Details of the geometry of the bead 17 are described in more detail with reference to FIG. 3.

The seal 15 is not only arranged in the region of the first axial end 19 of the closure element 8, but extends both on an outside 23 and on an inside 25 of the pot-like closure element 8 as far as its second axial end 21. In an edge region 27 of the base 9 of the pot-like closure element 8, the seal 15 surrounds the closure element 8 slightly on the outside 23 and thus forms an undercut which attaches the seal 15 to the closure element 8 particularly securely. Also, in this region the seal 15 forms a sealing face 10 to seal the bypass line 4.

Figure 3:
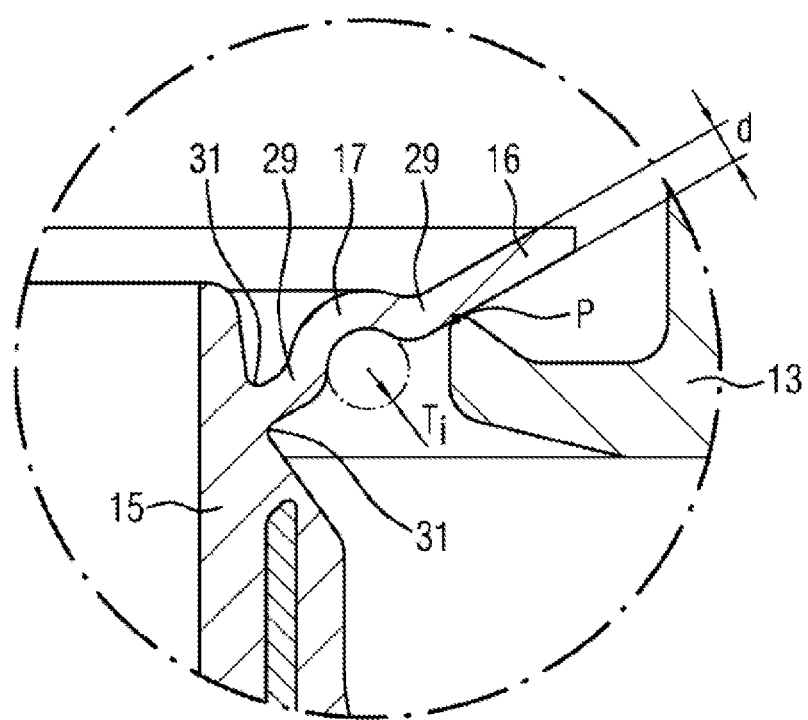
FIG. 3 is a detail of the valve according to FIG. 2.

FIG. 3 shows details of the seal lip 16 with the radially circumferential bead 17.

The bead 17 is formed by a channel-like bulge of the seal lip 16 that concentrically surrounds a longitudinal axis of the closure element 8. Accordingly, the bead 17 is not formed as a depression in the seal lip 16 with a wall thickness reduced relative thereto, but the seal lip 16 is deformed in the region of the bead 17, i.e. the seal lip 16 has substantially the same wall thickness over its entire extent, i.e. also in the region of the bead 17.

In the closed state of the valve 1, a contact region P is formed between the seal lip 16 and the second housing part 13. This contact region P simultaneously serves as a sealing face or sealing region and as an engagement point for a lever force which, because of the contact between the seal lip 16 and the second housing part, bends the seal lip 16 upward and hence deforms it. With the valve 1 according to one aspect of the invention, the deformability of the seal lip 16 is particularly good. This is because the seal lip 16 has a longer bending travel because of the bead 17, and therefore is deformed more greatly by the same applied force, in particular the force applied by the spring 7a. Accordingly, it is possible to close the valve 1 by the application of a smaller force while achieving the same good sealing effect.

In the embodiment shown, the seal lip 16 has a wall thickness d of 6 mm over its entire extent. The radius of curvature $r_i$ on the inside of the bead 17 is 0.6 mm, and on the outside it is 1.2 mm. In transitional regions 29 of the bead 17 to other regions of the seal lip 16, the radius of curvature is 0.5 mm on the inside and 1 mm on the outside of the curve. In the embodiment shown, the radius of curvature in the transitional region 31 of the seal lip 17 to the other regions of the seal 15 is 0.25 mm.

In the embodiment shown, the bead 17 has a semicircular form in longitudinal section. However, also for example a semi-oval form of the bead 17 would be possible.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve configured to block and release a flow path, comprising:
    an electromagnetic actuator unit;
    a pin configured to be axially moved by the electromagnetic actuator unit;
    a closure element connected to the pin, the closure element configured to block and release the flow path and having:
        a first axial end that is arranged remotely from the flow path and is connected to the pin; and
        a second axial end configured to be arranged in the flow path; and
    a housing that receives at least the pin and the first axial end of the closure element;
    wherein at least in a region of its first axial end, the closure element has a radially circumferential seal with an outwardly protruding seal lip,
    wherein the outwardly protruding seal lip lies sealingly against a region of the housing in a closed state of the valve,
    wherein the outwardly protruding seal lip has at least one radially circumferential bead, and
    wherein the closure element is formed pot-like and open at a top, and the radially circumferential seal covers both an outside and an inside of a side wall of the closure element.

2. The valve as claimed in claim 1,
    wherein the at least one radially circumferential bead is arranged in a radial direction between a sealing region of the outwardly protruding seal lip and the closure element.

3. The valve as claimed in claim 1,
    wherein the at least one radially circumferential bead is semicircular in longitudinal section and is formed open in a direction of the second axial end.

4. The valve as claimed in claim 1,
    wherein the at least one radially circumferential bead is semi-oval in longitudinal section.

5. The valve as claimed in claim 1,
    wherein the at least one radially circumferential bead has a wall thickness d with 0.4 mm≤d≤0.8 mm.

6. The valve as claimed in claim 1,
    wherein in a transitional region to the at least one radially circumferential bead, the outwardly protruding seal lip has a radius of curvature r with 0.5 mm≤r≤1.5 mm.

7. The valve as claimed in claim 1, wherein the radially circumferential seal furthermore covers at least regions of a base of the closure element.

8. The valve as claimed in claim 1,
    wherein the closure element is formed as a deep-drawn part.

9. The valve as claimed in claim 1,
    wherein the radially circumferential seal is made of a rubber.

10. The valve as claimed in claim 9,
    wherein the rubber is a fluoro-rubber.

11. A motor vehicle comprising:
    a turbocharger device comprising an intake side with a compressor and a turbine side with a turbine;
    a bypass line to the compressor is provided on the intake side;
    a valve is arranged in the bypass line for releasing or blocking the bypass line comprising:
    an electromagnetic actuator unit;
    a pin configured to be axially moved by the electromagnetic actuator unit;
    a closure element connected to the pin, the closure element configured to block and release a flow path and having:
        a first axial end that is arranged remotely from the flow path and is connected to the pin; and
        a second axial end which can be arranged in the flow path; and
    a housing that receives at least the pin and the first axial end of the closure element;
    wherein at least in a region of its first axial end, the closure element has a radially circumferential seal with an outwardly protruding seal lip,
    wherein the outwardly protruding seal lip lies sealingly against a region of the housing in a closed state of the valve,
    wherein the outwardly protruding seal lip has at least one radially circumferential bead, and
    wherein the closure element is formed pot-like and open at a top, and the radially circumferential seal covers both an outside and an inside of a side wall of the closure element.

* * * * *